United States Patent
Edgar et al.

(10) Patent No.: US 9,189,550 B2
(45) Date of Patent: Nov. 17, 2015

(54) QUERY REFINEMENT IN A BROWSER TOOLBAR

(75) Inventors: Timothy Edgar, Bellevue, WA (US); Ambarish Chitnis, Redmond, WA (US); Ryen William White, Woodinville, WA (US); Pavel Dmitriev, Bellevue, WA (US); Rajanikanth Ageeru, Bellevue, WA (US); Ovidiu Dan, Bethlehem, PA (US); Lin Tang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 625 days.

(21) Appl. No.: 13/299,089

(22) Filed: Nov. 17, 2011

(65) Prior Publication Data

US 2013/0132357 A1    May 23, 2013

(51) Int. Cl.
*G06F 17/30* (2006.01)
(52) U.S. Cl.
CPC ............... *G06F 17/30864* (2013.01)
(58) Field of Classification Search
CPC .............. G06F 17/30864; G06F 17/30867; G06F 17/30672
USPC ........................................................ 707/765
See application file for complete search history.

(56) References Cited

U.S. PATENT DOCUMENTS

| 7,840,538 | B2 | 11/2010 | Joshi et al. | |
|---|---|---|---|---|
| 7,917,528 | B1 | 3/2011 | Dave et al. | |
| 7,958,115 | B2 | 6/2011 | Kraft | |
| 8,145,623 | B1* | 3/2012 | Mehta et al. | 707/713 |
| 2005/0187954 | A1* | 8/2005 | Raman et al. | 707/100 |
| 2006/0117003 | A1* | 6/2006 | Ortega et al. | 707/4 |
| 2006/0253427 | A1* | 11/2006 | Wu et al. | 707/3 |
| 2007/0143264 | A1* | 6/2007 | Szeto | 707/3 |
| 2007/0162422 | A1* | 7/2007 | Djabarov | 707/2 |
| 2007/0233671 | A1* | 10/2007 | Oztekin et al. | 707/5 |
| 2007/0266015 | A1* | 11/2007 | Shakib et al. | 707/4 |
| 2007/0266342 | A1* | 11/2007 | Chang et al. | 715/810 |
| 2007/0276803 | A1* | 11/2007 | Shakib et al. | 707/3 |
| 2008/0270364 | A1* | 10/2008 | Bayardo et al. | 707/3 |
| 2010/0070482 | A1* | 3/2010 | Punaganti Venkata et al. | 707/706 |
| 2010/0076979 | A1 | 3/2010 | Wang et al. | |
| 2010/0114925 | A1* | 5/2010 | Shafer et al. | 707/759 |
| 2010/0146012 | A1* | 6/2010 | Beaudreau et al. | 707/803 |

(Continued)

OTHER PUBLICATIONS

Irmak et al. ("Contextual ranking of keywords using Click Data", IEEE international conference on data engineering, 2009).*

(Continued)

*Primary Examiner* — Syed Hasan
(74) *Attorney, Agent, or Firm* — Dave Ream; Michelle Crosslin-Webb; Micky Minhas

(57) ABSTRACT

Embodiment described herein are generally directed to a toolbar extension of a web browser that grabs a user's search engine query and suggests a refined search query known to yield better search results. The toolbar recognizes the web page the user is on as being associated with a search engine and retrieves the user's search query. The toolbar interacts with a refinement component on a server, and the refinement component determines a refined search query based on confidence scores assigned to data mined from a data center affiliated with different search engine (one related to the toolbar). The refined search query is returned and displayed in a search field of the toolbar, allowing the user to easily run the refined search on the different search engine.

16 Claims, 6 Drawing Sheets

(56) References Cited

U.S. PATENT DOCUMENTS

| | | | | |
|---|---|---|---|---|
| 2010/0161313 | A1* | 6/2010 | Karttunen | 704/9 |
| 2010/0299342 | A1* | 11/2010 | Gustafson et al. | 707/759 |
| 2011/0060752 | A1* | 3/2011 | Lane et al. | 707/766 |
| 2011/0072033 | A1 | 3/2011 | White et al. | |
| 2012/0066243 | A1* | 3/2012 | Jammalamadaka | 707/759 |

OTHER PUBLICATIONS

White, et al., "Predicting Short-Term Interests Using Activity-Based Search Context", In Proceedings of the 19th ACM International Conference on Information and Knowledge Management, Oct. 26-30, 2010, pp. 1009-1018.

Liao, et al., "Mining Concept Sequences from Large-Scale Search Logs for Context-Aware Query Suggestion", In Proceedings of ACM Transactions on Intelligent Systems and Technology, vol. 9, Issue 4, 2011, pp. 1-40.

Ponnuswam, et al., "On Composition of a Federated Web Search Result Page: Using Online Users to Provide Pairwise Preference for Heterogeneous Verticals", In Proceedings of the fourth ACM International Conference on Web Search Data Mining, Feb. 9-12, 2011, pp. 715-724.

* cited by examiner

QUERY REFINEMENT IN A BROWSER TOOLBAR

BACKGROUND

Web searching has come a long way but can still be very frustrating for Internet users. The ability of a user to navigate to useful information using a modern search engine still largely hinges on the accuracy of the user's search terms. When the search terms yield few results, or results far off base from the user's intent, the user has little recourse than to enter better terms. For all the technological advancements that provide a user access to the glut of information available online, people are stuck with a rudimentary hunt-and-peck approach to find what they want. Modern search engines try desperately to help visitors accurately find information, knowing full well that its effectiveness for finding online content drives traffic to or from the search engine. Increased traffic brings increased advertising revenue, so the underlying search service becomes the lifeblood of a search engine.

Many of today's search engines provide a toolbar that users can download as an extension to a client's web browser. Toolbars are graphical menus of different options and features integrated into a web browser in a seamless manner. Common features include text fields for submitting search engine queries, proactive alerts, access to popular web sites, email capability, and the like. One particular feature that aids the user experience is the ability to copy—or "ghost"—a search query a user enters in the search field for a search engine into a search field on the toolbar. Such a feature can be seen in the Bing® toolbar, developed by the Microsoft Corporation headquartered in Redmond, Wash.

SUMMARY

This summary is provided to introduce a selection of concepts in a simplified form that are further described below in the Detailed Description. This summary is not intended to identify key features or essential features of the claimed subject matter. Nor is this summary intended to be used as an aid in determining the scope of the claimed subject matter.

One aspect is directed to a toolbar extension of a web browser that grabs a user's search engine query and suggests a refined search query known to yield better search results. The toolbar recognizes the web page the user is on from the page's URL and determines that the page is associated with a search engine. The toolbar also retrieves the user's search query. In one embodiment, a refinement component on a server determines a refined search query based on confidence scores assigned to historical user searches and actions (e.g., clickthrough rates, dwell times, etc.) mined from a data center of the different search engine, which may be affiliated with the toolbar. Alternatively or additionally, co-occurrences of terms on different web pages may be used to come up with different terms in the refined search query. Moreover, some embodiments may rely on dictionaries, thesauri, or other source from which a mapping from search query to refined search query can be generated when generating the refined search query. The refined search query is returned and displayed in a search field of the toolbar, allowing the user to easily search for the refined search query on the different search engine.

Another aspect is directed to displaying a refined search query in a toolbar of a web browser on a client computing device. A search query is received on a displayed web page. The toolbar recognizes the web page as being a search engine and consequently retrieves a user-submitted search query. The toolbar requests a refined search query to suggest to the user based on the search query, and upon reception, displays the refined search query in a text field of the toolbar for the user to easily conduct such a search. The refined search query is displayed in the toolbar while search results for the user-submitted search query are displayed below in a results page. Embodiments are not limited, however, to displaying the refined search query in a text field of the toolbar. Alternative embodiments may display the refined search query anywhere on or adjacent to the toolbar, such as, for example, in a fly-out or pop-up window, balloon, drop-down menu, or some type of animation. Electing to run the refined search query triggers the toolbar to do so in a different search engine than the one the user originally visited.

Another aspect is also directed to displaying a refined search query in a toolbar of a web browser on a client computing device. Once a user navigates to a web page of a search engine and requests a search for a search query, the toolbar identifies that the user is on a search engine, using an expression file, and consequently grabs the search query. Based on the search query, the URL of the web page, content of a web page through parsing underlying hypertext markup language (HTML), or a combination therefore, the toolbar determines a vertical being searched. Going back and forth with a refinement component on a server, the toolbar receives and displays a suggestion for the user to search for the search query or a refined search query on a different vertical. If the user elects to do so, the new search with the different vertical may be performed on a different search engine—one affiliated with the toolbar.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
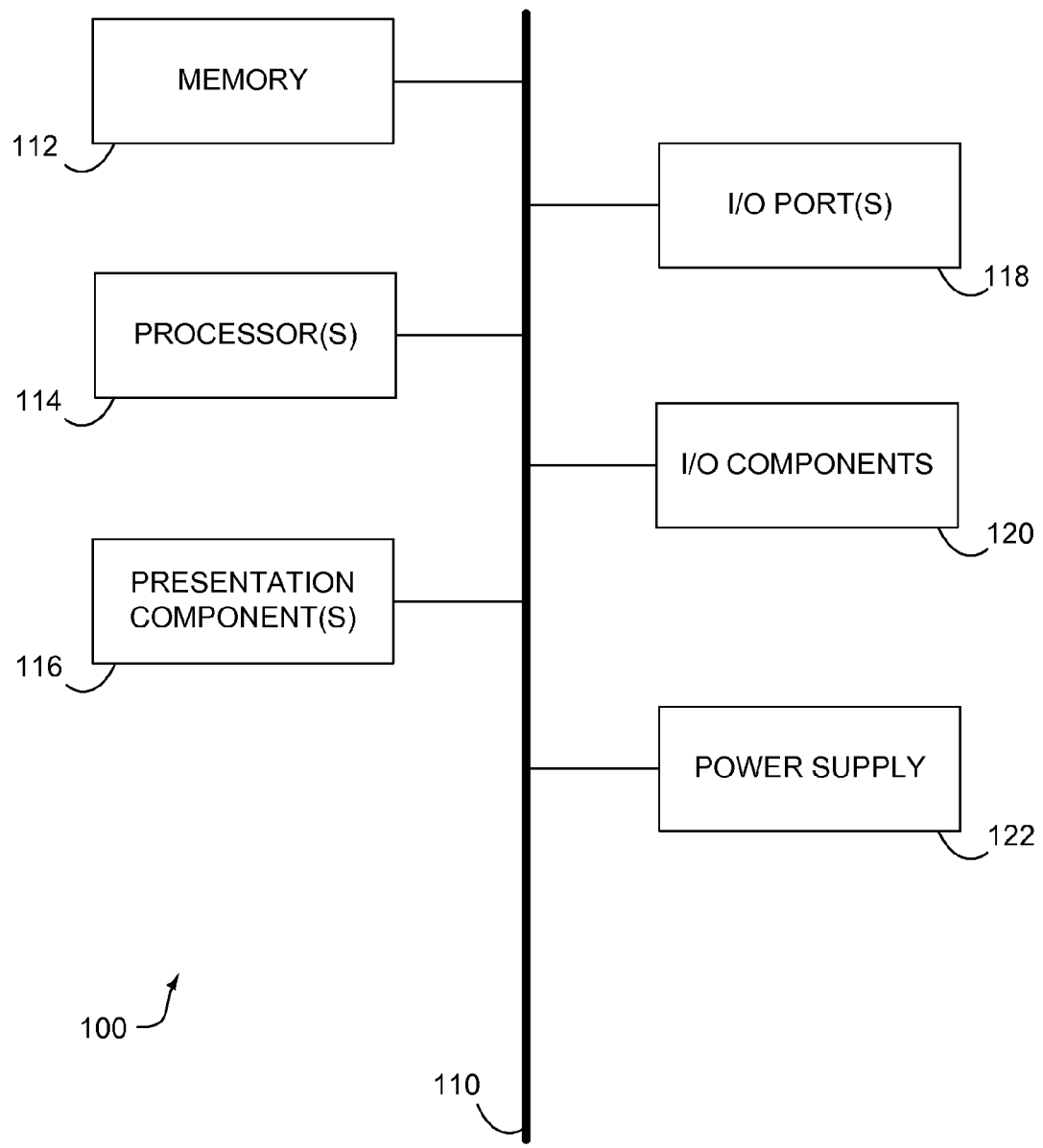
FIG. 1 is a block diagram of an exemplary computing environment suitable for implementing embodiments discussed herein.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Generally speaking, one aspect is directed to a web browser toolbar that presents suggestive search queries to a user conducting a search on a search engine. The suggestive search queries are based on the search query the user enters on the search engine's web page, but refined to be more accurate. When the user navigates to the search engine and initiates a search query, the toolbar recognizes that the displayed web page belongs to a search engine; recognizes the user-entered text is likely a search query; and recognizes the vertical associated with either the web page, search engine, implicit in search query, or a combination thereof. In one embodiment, the toolbar interacts with a server or another search engine to determine whether a better search query can be suggested to the user. To do so, one embodiment examines historical search logs from many users to determine whether a refined search query has historically yielded better results. If so, the refined search query is sent to the client computing device and displayed in the toolbar.

One embodiment displays the results of the search query in a search results page while simultaneously displaying the terms of the refined search query in a text field of the toolbar. As a result, the user can weigh the results in the search results page, and if not satisfied, the user can quickly run a search for the refined search query by clicking a search button adjacent in the toolbar. If the user runs such a search, one embodiment performs the search on a different search engine and presents results for the refined search query in a web page belonging to the different search engine.

To illustrate, not to limit embodiments described herein, consider a user entering the text "Trip to Hawaii" in the search field of the search engine Google® being displayed in web browser with a Bing® toolbar. The Bing® toolbar may communicate with a server, or remote service, and determine that users have historically been more satisfied with the search query "Vacation packages to Hawaii." The latter represents a refined search query, and the Bing® toolbar may be configured to suggest this refined search query to the user. As a result, the user may be viewing, in one embodiment, a typical search results page from Google® and a recommendation to try the refined search query in the Bing® toolbar. If the user clicks a search button in the toolbar, one embodiment requests the search engine Bing® perform a search for the refined search query, resulting in a Bing® search results page being displayed with corresponding results. Alternative embodiments may submit the refined search to the original search engine—Google® in the above example—for processing. Either way, the user saves a lot of time if the refined search query proves more effective at locating what the user is searching, and the search engine of the toolbar may drive more traffic to the toolbar search engine.

Refined search queries may suggest different search terms and/or searching different "verticals," which refer to specifically focused segments or classifications of online content that are searched by vertical search engines. The vertical content area may be based on topicality, media type, genre of content, locality, or the like. Common verticals include web, news, images, video, audio, finance, travel, medical, legal, travel, a particular location, or the like. For example, a user submitting a search query to the uniform resource locator (URL), images.bing.com, is instructing the Bing® Images vertical search engine to search for images relevant to the search query. Using the appropriate vertical and vertical search engine, a user can easily focus search results to a particular type of content (e.g., news, web sites, images, video, etc.).

Just as search queries can be suggestively refined, one embodiment also suggests that a user choose a different vertical to conduct a search. Such a suggestion aids the user in recognizing when he/she is searching on the wrong vertical, or when the search may yield historically more accurate results when searched in a different vertical. For example, a user searching a "Web" vertical for the query "Leonardo's most famous painting" may find better results when searching under an "Images" vertical for the query "The Mona Lisa by Leonardo da Vinci." Instead of directing user from a general (e.g., Web) to a specific vertical (e.g., Image), an alternative embodiment directs users from a specific to a general search in the same vertical. For example, a suggestion may be made that for user searching on an image vertical to search for a web page such as the Facebook® homepage. In such an example, the toolbar suggests the user run the latter refined search in the different vertical. Numerous other examples could be given but need not, as it can simply be put that search queries may be refined by terms and/or verticals.

Before proceeding, a few definitions should be discussed. A "search query" refers to user-entered keywords, phrases, or terms that are submitted to a search engine. A "refined search query" refers to a different set of keywords, phrases, or terms than those submitted by a user in a search query. Additionally or alternatively, a refined search query may include a different a vertical than the vertical designated by the search engine, indicated by the user, or implied in the search query.

A "related-search clickthrough rate (CTR)" refers to an indication of the frequency users have historically opted to search for one or more refined search queries or terms in refined search queries. For example, one embodiment calculates the aggregate number of users who have elected to search for "Vacation packages to Hawaii" when presented as a refined or related search to an original search query. Numerous ways exist to express related-search CTRs, such as an aggregate number, percentage, or other statistical representation.

A "follow-up CTR" refers to an indication of the frequency users have historically clicked a search engine result stemming from a refined search query or term. Considering the previous example again, one embodiment calculates the aggregate number of users who have selected a result generated by searching for "Vacation packages in Hawaii." Numerous ways exist to express related-search CTRs, such as an aggregate number, percentage, or other statistical representation.

Related-search CTRs and follow-up CTRs may be computed and stored on a backend server or database and accessed via jobs or script queries. The underlying data for the related-search CTRs and follow-up CTRs, in one embodiment, is taken from historical user log or search data transmitted by different instances of a browser toolbar. One skilled in the art will understand that backend servers or databases may use various techniques to aggregate, quantify, store, manage, and provide accessibility to historical user log and search data.

As used herein, "components" refer to a computer-related entity, either hardware, software (e.g., in execution), and/or firmware. Components may operate in a client-server relationship to carry out various techniques described herein. Such computing is commonly referred to as "in-the-cloud" computing. For example, a component may be a process running on a processor, a library, a subroutine, and/or a computer or a combination of software and hardware. By way of illustration, both an application running on a server and the server may be a component. One or more components can reside within a process, and a component can be localized on a computing device (such as a server) or distributed between two or more computing devices communicating across a network.

An exemplary operating environment in which various aspects of some embodiments may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, smartphone, digital phone, handheld device, BlackBerry®, personal digital assistant (PDA), or other device capable of executing computer instructions.

Embodiments include computer code or machine-useable instructions, including computer-executable instructions such as program modules, being executed by a computer or other machine, such as a PDA or other handheld device. Generally, program modules including routines, programs, objects, components, data structures, and the like, refer to code that perform particular tasks or implement particular abstract data types. Embodiments described herein may be practiced in a variety of system configurations, including hand-held devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

Within memory 102, computing device 100 may have stored web browser and a web browser toolbar or other extension. One skilled in the art will understand and appreciate that various web browsers may be stored, such as, for example, Internet Explorer®, Firefox®, Safari®, or the like. Different search engines may offer various proprietary toolbars and extensions, such as, for example, Bing® Bar, Google® Toolbar, Yahoo! Toolbar, or the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
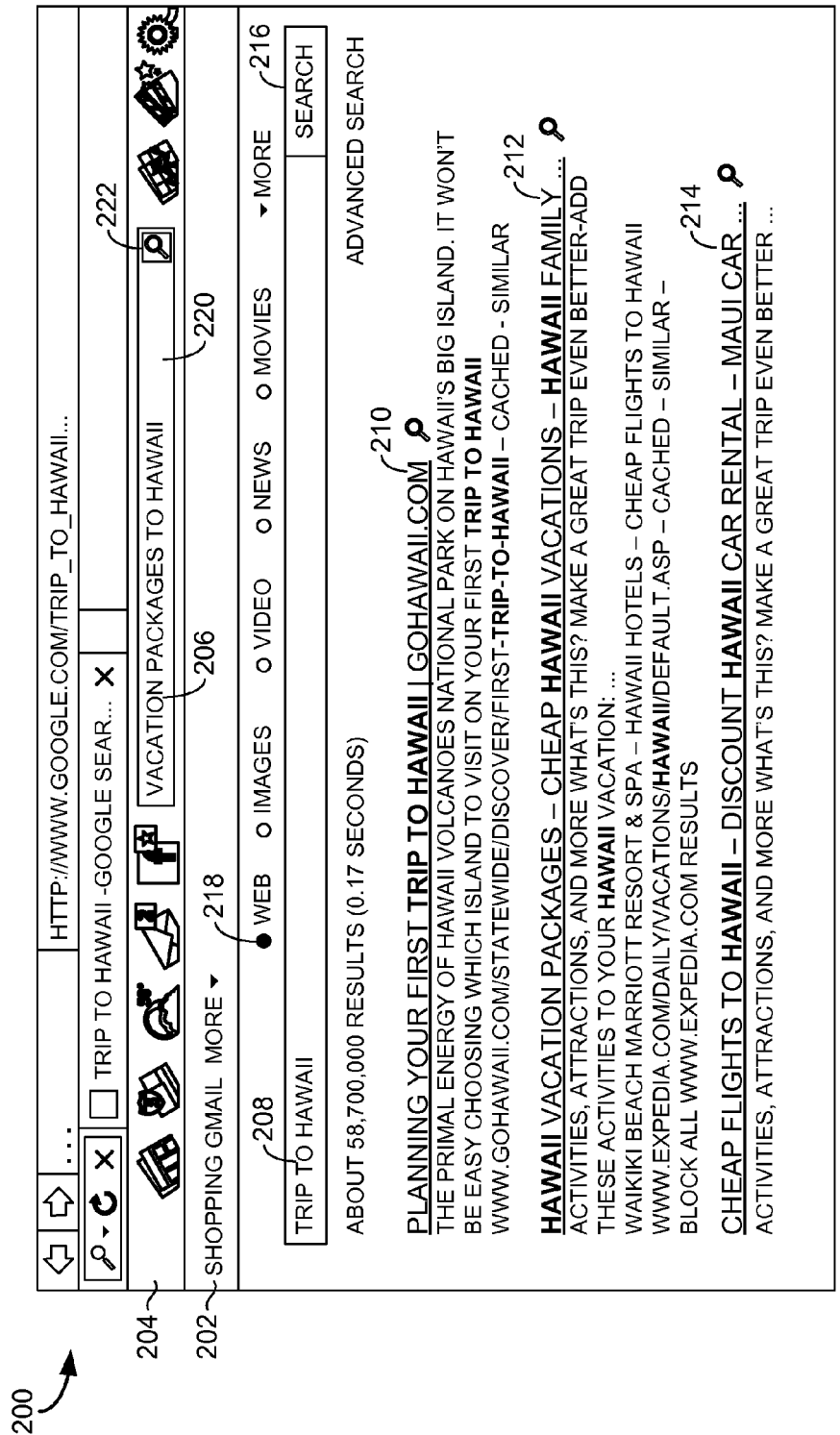
FIG. 2 illustrates a screen shot of a web browser rendering a web page with a toolbar that suggests a refined search query to a user in accordance with one embodiment.

FIG. 2 illustrates a screen shot of a web browser 200 rendering a web page 202 with a toolbar 204 that suggests a refined search query 206 to a user in accordance with one embodiment. A user using the web browser navigated to the Google® search engine and performed a search for search query 208 with terms "trip to Hawaii." Web page 202 shows the resultant search results 210, 212, and 214. Upon hitting Search button 216, toolbar 204 detected that the user was on a web page of the search engine and had submitted search query 208. Toolbar 204 contacted a server that hosts a refinement service, passing along search query 208 and an indication of the vertical being searched, which in FIG. 2A is shown as News vertical 218. Refined search query 206 was eventually selected—either by the client's web browser 200 or by the refinement service—and displayed in text field 220 of toolbar 204. Magnifying glass button 222 provides an option for the user to run a search for refined search query 206. Upon clicking magnifying glass button 222, a search using refined search query 206 will be initiated on a search engine specified by toolbar 204—e.g., Bing®.

Figure 3:
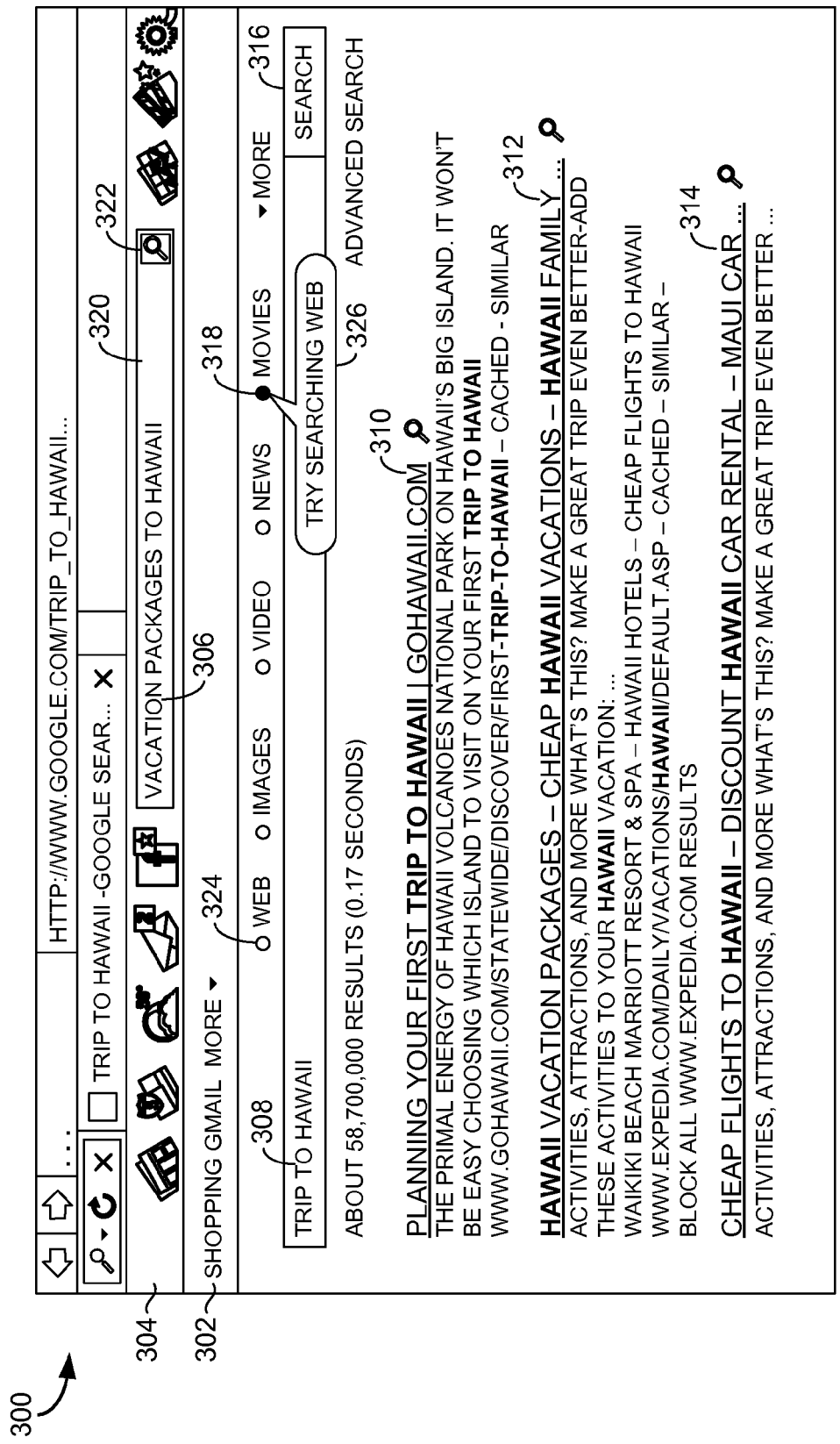
FIG. 3 illustrates a screen shot of a web browser rendering a web page with a toolbar that suggests a refined search query to a user in accordance with one embodiment.

FIG. 3 illustrates a screen shot of a web browser 300 rendering a web page 302 with a toolbar 304 that suggests a refined search query 306 to a user in accordance with one embodiment. A user using the web browser navigated to the Google® search engine and performed a search for search query 308 of terms "trip to Hawaii," mistakenly on a vertical for movies (movies vertical 318). Web page 302 shows the resultant search results 310, 312, and 314. Upon hitting Search button 316, toolbar 304 detected that the user was on a web page of a search engine and had submitted search query 308. Toolbar 304 contacted a server that performs a refinement service, passing along search query 308 and an indication of the Movies vertical 318 that was mistakenly selected. Refined search query 306 was eventually selected—either by the client's web browser 300 or by the refinement service—and displayed in text field 320 of toolbar 304. Additionally, refinement service returned a different vertical (web vertical 324) to suggest the user search. A pop-up dialog 326 is shown suggesting the user search the different vertical displayed around toolbar 304. Magnifying glass button 322 provides an option for the user to run search refined search query 306 in the different vertical. Upon a user clicking magnifying glass button 322, a search using refined search query 206 in web vertical 324 will be initiated on a search engine specified by toolbar 304—e.g., Bing®.

Figure 4:
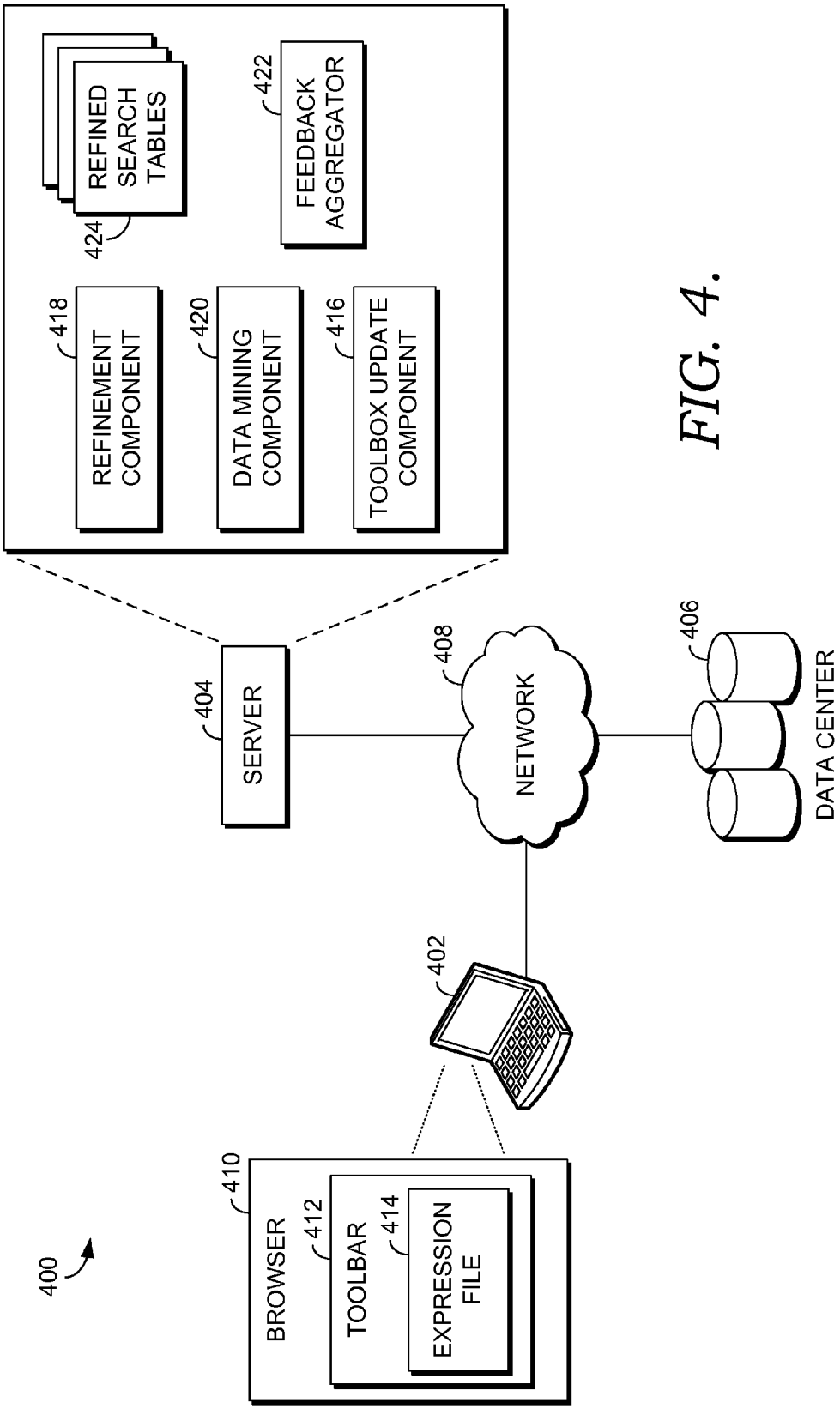
FIG. 4 illustrates a networked environment in accordance with one embodiment.

FIG. 4 is a diagram of a networked environment 400 in accordance with one embodiment. Networking environment 400 comprises a client computing device 402, server 404, and database center 406, each able to communicate across network 408. While any of the illustrated devices may communicate with each other, in operation, client computing device 402 communicates with server 404, which functions as a front-end server, and server 404 interacts with database center 406, which functions as a back-end depository for data.

Network 408 may include any computer network or combination thereof. Examples of computer networks configurable to operate as network 408 include, without limitation, a wireless network, landline, cable line, fiber-optic line, local area network (LAN), wide area network (WAN), metropolitan area network (MAN), or the like. Network 408 is not limited, however, to connections coupling separate computer units. Rather, network 408 may also comprise subsystems that transfer data between servers or computing devices. For example, network 408 may also include a point-to-point connection, the Internet, an Ethernet, a backplane bus, an electrical bus, a neural network, or other internal system.

Client computing device 402 may be any type of computing device, such as device 100 described above with reference to FIG. 1. By way of example only and not limitation, client computing device 402 may be a personal computer, desktop computer, laptop computer, handheld device, mobile phone, smartphone, electronic tablet, handheld device, or the like. One skilled in the art will understand and appreciate that numerous devices may function as a client in modern client-server computing models.

Client computing device 402 includes browser 410, a web browser like Internet Explorer®, Firefox®, Safari®, or the like. Browser 410 comprises toolbar 410 with various web-browsing features. Browser 410 also includes expression file 414 that stores mappings or tables of correlations between URLs, search engines, and indications of verticals either in the URLs or in a user's search query terms. In one embodiment, expression file 414 is updated regularly by toolbar update component 416 on server 404, either in a push, pull, or push-pull manner. Expression file 414 may be stored as an extensible markup language (XML), text file (txt), or other type of file capable of associating URLs with verticals and/or search terms.

In one embodiment, expression file 414 is a linking or correlation of URLs to their underlying search engines. For example, expression file 414 may indicate that www.bing.com, www.google.com, and www.ebay.com are all search engines. Expression file 414 may also indicate the verticals associated with different URLs: for example, images.bing.com would be associated with the vertical images vertical. Along the same lines, some search engines default to a specific vertical, so expression file 414 may link the search engine's home site to a default vertical. For example, www.bing.com may be assigned to a web vertical, www.ebay.com may be assigned to a product vertical, and www.flixster.com may be assigned to a movie vertical. Additionally, expression file 414 may, in some embodiments, include expressions for each listed search engine and what vertical is mapped to such an expression. For instance, a search query on www.bing.com that includes the word "pictures" or "pics" may be linked to the images in expression file 414. Or, in another example, a known stock ticker symbol, when detected in a search query, may be linked to a financial or stock vertical.

Client computing device 402 may communicate with server 404 or database center 406 using a transfer protocol, such as, for example, the Hypertext Transfer Protocol (HTTP), Hypertext Transfer Protocol Secure (HTTPS), file transfer protocol (FTP), Transport Layer Security (TLS), Secure Sockets Layer (SSL), or the like.

Server 404 may be any type of server (or servers) capable of executing toolbar update component 416, refinement component 418, data mining component 420, and feedback aggregator 422. Server 404 stores (either in cache, relationally, or on a hard drive) and manages refined search tables 424. Server 404 may run a cloud platform to interact with datacenter 406. One skilled in the art will be familiar with a host of cloud platforms, such as Windows Azure™, SQL Azure™, Google AppEngine, Amazon Web Services, and the like.

Data center 406 stores historical user query and search log data for traffic to a particular search engine. For instance, Bing® may track searches performed on its search engine and pass relevant data about such searches to data center 406. Things such as CTR rates, related-search CTR, follow-up CTR, query logs dwell times, search frustration, user profiles, and various other metrics may be tracked with particular search terms and aggregated across all users to gain an understanding of the most efficient search terms. Data center 406 is not limited to search data gathered from a search engine. Some embodiments will also collect historical user log data from toolbars downloaded to user web browsers. The toolbars are configured to periodically send the historical user log data to data center 406, or a server that acts as a front-end to data center 406.

In operation, toolbar 412 uses the URL, vertical, and expression mappings designated in expression file 414 to recognize when a user navigates to a web page of a search engine. Once toolbar 412 detects the user is on a search engine web page, toolbar 412 retrieves the search query the user enters on the page and transmits the search query to server 404, which passes the search query to refinement component 418. Refinement component 418 checks to see whether a more optimal search query could be suggested to the user of browser 410. To do so, refinement component 418 accesses refined search tables 424 and vertical tables 526. Refined search tables 424 are built by data mining component 420, which queries data center 406 for the most successful searches for particular search query terms. For the search query terms, data center 406 returns refined search queries and corresponding confidence scores based on the historical user log and search data. The confidence scores act as filters on the possible refined search queries in that the data mining component, in one embodiment, only adds those refined search queries that meet a specific threshold to refined search tables 424.

Confidence scores are computed using different heuristics. While any historical user search characteristics may be used, one embodiment determines confidence scores based on related-search CTRs, follow-up CTRs, number of impressions of the refined or related search query (i.e., how many times it was suggested), or a combination thereof. Aside from the heuristics mentioned herein, confidence scores and/or rules may be based on search engine switching rates or reformulation rates. In one embodiment, only refined search queries with related-search CTRs greater than or equal to 1% make the cut. This embodiment also limits refined search queries to those that include have greater than or equal to 50% follow-up CTRs. Confidence scores and/or refined search query terms may, in some embodiments, be based on co-occurrences of words, phrases, or multimedia (e.g., images, video, audio) on web pages. Other embodiments may also or alternatively use dictionaries, thesauri, or other references when computing confidence scores and/or refined search query terms. These percentages may differ in various embodiments and are not meant to limit all embodiments. In an alternative embodiment, refinement component 418 generates a refined search query using one or more rules instead of using the confidence scores. The rules may be binary, or may include any of the heuristics mentioned herein.

Another embodiment considers the number of times a refined search query has been presented to users and/or the number of times users have selected the refined search query when figuring confidence scores. For example, refined search queries may only be selected for refined search tables 424 after being presented to users 100 times. Like the percentages above, such a number of impressions that a refined search query has been presented may differ in various embodiments and are not meant to limit all embodiments.

Data mining component 420 stores those refined search queries with the acceptable or the highest confidence scores in refined search tables 424. Because confidence scores depend on user search heuristics that are constantly influx, data mining component 420, in one embodiment, constantly updates the refined search queries in refined search tables 424 based on newly calculated confidence scores. Additionally or alternatively, data mining component may query data center 406 for recommended verticals related to refined search queries. In response, data center 406 returns the most successful verticals for refined search queries based on the user log and search data.

When refinement component 418 receives a request from toolbar 412 to see if there are any refined search queries that may be better than the search query a user entered on a detected search engine web page, refinement component 418 accesses refined search tables 524 and selects a refined search query. Selection may be predicated on confidence scores, term-matching to the user-entered search query, vertical appropriateness, or a combination thereof. The selected refined search query is passed back to toolbar 412, which suggests the refined search query or new vertical to the user. In one embodiment, the suggestion is made by entering refined search query into a text field of toolbar 412. Or if a different vertical is being suggested, displaying a dialog window or balloon adjacent to the text field of toolbar 412. The refined search query and/or the different vertical may be suggested to the user in a number of different ways.

Once suggested, the user may elect to search for the refined search query, or in the different vertical, by selecting a search button in toolbar 412. In one embodiment, when the user does so, the refined search query is sent to the search engine that associated with toolbar 412, which may differ from the search engine web page being rendered. For example, a user may enter a search query on Google®, and a refined search query or different vertical may be suggested in a Bing® Toolbar. If the user clicks the search button in the Bing® Toolbar, browser 410 will request a search be run in Bing® with the refined search query or different vertical, resulting in search engine results being displayed in a Bing® results page afterward. Thus, in effect, the Bing® Toolbar provides an avenue to drive traffic to the Bing® search engine by suggesting better searches or verticals.

One embodiment also collects feedback data about the effectiveness of the refined search query and/or suggestions for a different vertical to search. The feedback may be transmitted to aggregator collector 422, which collects, aggregates, and stores (possibly on data center 406) the feedback about refined search queries and suggested verticals. Indications of whether users elect to search for the refined search query or different vertical are sent either to server 404 or directly to data center 406 for collection. Such information may be used in later calculations of confidences scores as another metric or in conjunction with other heuristics.

Figure 5:
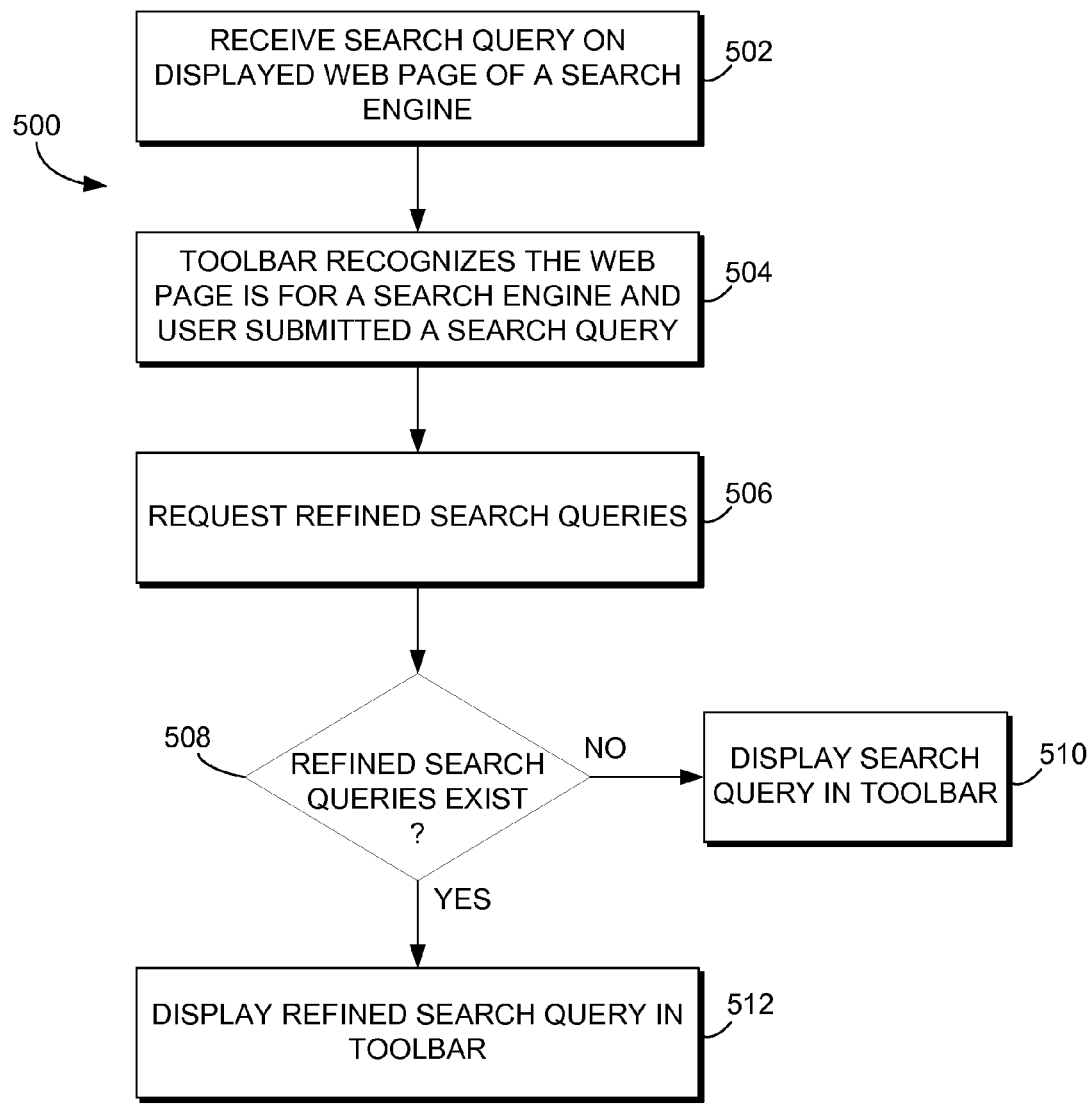
FIG. 5 illustrates a flow chart for suggesting a refined search query to user in accordance with one embodiment.

FIG. 5 illustrates a flow chart for suggesting a refined search query to user in accordance with one embodiment. Flow 500 begins when a user navigates to a search engine web page and enters a search query on a client computing device, as shown at 502. As shown at 504, a toolbar on the client's browser accesses an expression file and, based on the list of URLs in the expression file, recognizes that the web page is associated with a search engine and that what the user entered was a search query. Once the user requests the search engine perform a search, the toolbar passes the search query to a server and requests whether any refined search queries would perhaps be better search candidates for the user, as shown at 506.

The decision box at 508 illustrates work done by a server to find refined search queries for the user's search query. To do so, the server may access internally stored refined search tables that are generated after mining a data center storing historical log and search data from users of a different search engine. Confidence scores may be used to locate a refined search query relevant to the user's search query. Yet, if no refined search queries can be found, one embodiment will simply display the user's search query in the toolbar. If a refined search query is found, in one embodiment, the refined search query is displayed to the user in a text field of the toolbar adjacent to a search button, as shown at 512. The suggestion may be displayed on or adjacent to the toolbar and may be highlighted or presented with a blinking background to garner attention.

Should the user choose to search for the refined search query, the user can click the search button, resulting in the browser searching for the refined search query on a different search engine—such as the one supplying the data for the data center. The toolbar may also send feedback data about the effectiveness of the refined search query to the server or the data center.

Figure 6:
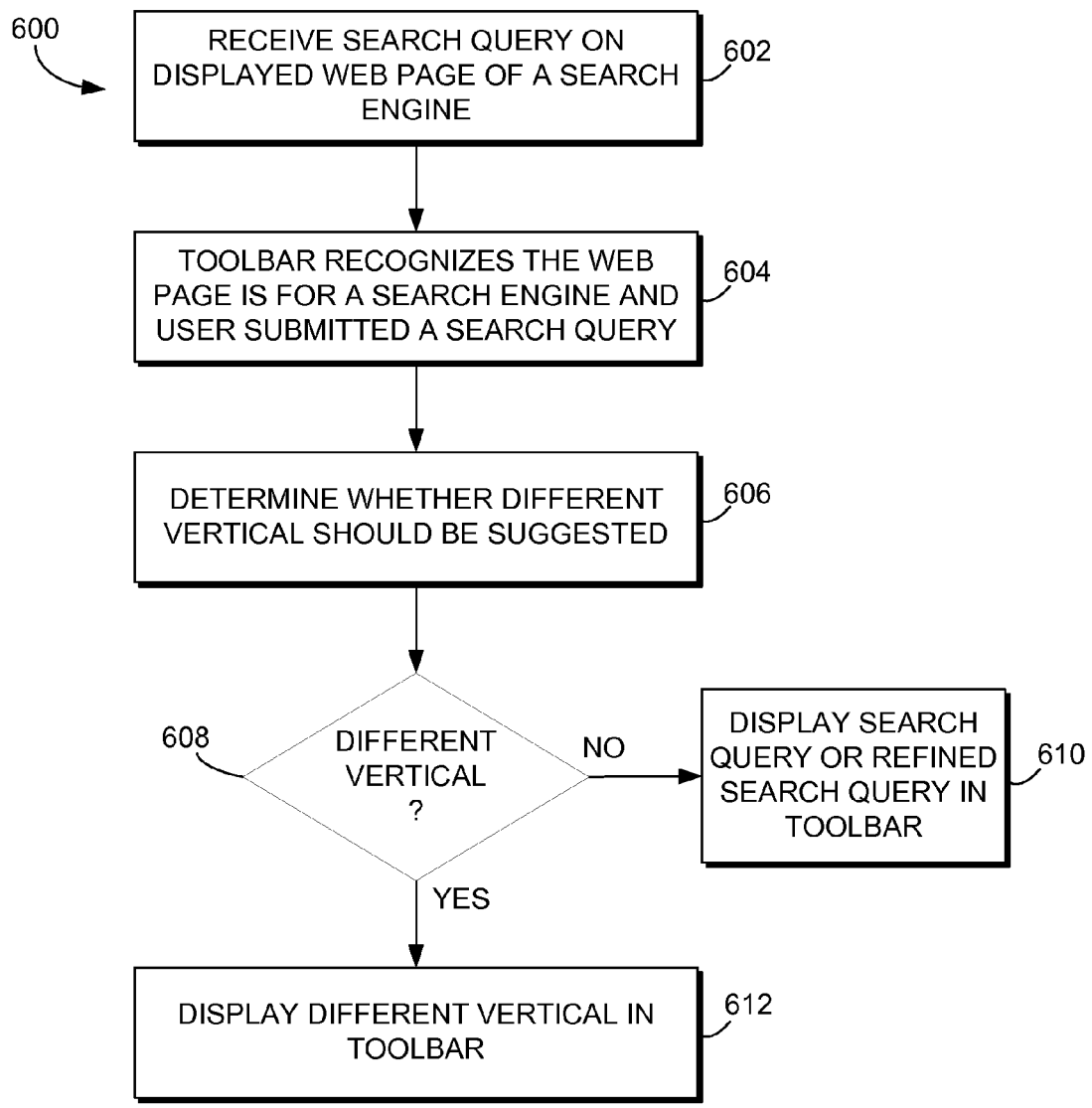
FIG. 6 illustrates a flow chart for suggesting a refined search query to user in accordance with one embodiment.

FIG. 6 illustrates a flow chart for suggesting a refined search query to user in accordance with one embodiment. Flow 600 begins when a user navigates to a search engine web page and enters a search query on a client computing device, as shown at 602. As shown at 604, a toolbar on the client's browser accesses an expression file and, based on the list of URLs in the expression file, recognizes that the web page is associated with a search engine and that what the user entered was a search query. A vertical is determined based on the web page, search engine, search query, or a combination thereof. For example, images.bing.com indicates the user is search an image vertical. Terms in the search query "Trips to Hawaii" indicates the user is searching the vertical travel. Searching on eBay indicates the user is searching a shopping or product vertical. Alternatively, a user may be searching generally on a vertical (e.g., products, images, etc.), but the refined search query may suggest that the user search a more specific vertical. For example, a user may submit the search query "Facebook" on an images vertical, and as a result, suggestions are made t to the user to try searching for the following refined search queries, which relate to images for Facebook®: "Facebook profile," "Facebook logo," "Facebook icon," "Facebook button," or some other image associated with the Facebook®.

Based on the vertical for the search query, a determination is made about whether to suggest a different vertical, as shown at 606. This determination may be made by the client, by the toolbar accessing an expression file of URLs, expressions, and/or vertical indications, or by a server analyzing like parameters. Either way, if it is determined that the user is on the right vertical—or at least on a the most efficient search vertical for the search query or a refined search query—then the search query, or a refined search query, is displayed to the user without indicating a different vertical. If it is determined that the user is searching the wrong or inefficient vertical for the search query, however, a suggestion of a different vertical may be displayed in or around the toolbar.

FIGS. 5 and 6 cover refining a user's search query and vertical associated with a user-specified search query somewhat separately, but some embodiments may actually suggest both refined search queries and different verticals at the same time. For example, a person searching the web for "Trip to Hawaii" may eventually see "Vacation Packages to Hawaii" in a toolbar text field or any of the aforementioned ways of suggesting the refined search query (e.g., pop-up or drop-down window, dialog, balloon, etc.), stating "Try running on Bing® Travel" to indicate a different vertical. In such an example, the refined search query would be run in the different vertical should the user elect.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for displaying a refined search query in a web browser on a client computing device, the method comprising:
   receiving, by the web browser, a search query input into a web-page search field provided by a displayed web page;
   recognizing, by a toolbar of the web browser, that the displayed web page is associated with a search engine by comparing at least a portion of a URL of the displayed web page with a list of text strings of URLs identified as search engines and by correlating the at least a portion of the URL with one or more text strings included in the list of text strings, the toolbar including a toolbar search field separate from the web-page search field;
   identifying, by the toolbar, a first vertical that is selected to be applied to the search query;
   communicating a request to send a refined search query when the search query is sent to the search engine, wherein the request specifies the first vertical;
   receiving the refined search query that specifies a second vertical, which is different from the first vertical; and
   in the web browser, displaying search results for the search query at the same time as displaying the refined search query in the toolbar search field.

2. The computer-implemented method of claim 1, further comprising:
   receiving a user indication to search for the refined search query; and
   requesting a search of the refined search query from a different search engine that is different from the search engine.

3. The computer-implemented method of claim 1, further comprising:
   receiving search results for the refined search query from the different search engine; and
   displaying the search results for the refined search query in an impression of the different search engine.

4. The computer-implemented method of claim 1, wherein the toolbar search field comprises a portion of the toolbar that is included within the browser window and that does not overlap the displayed web page.

5. The computer-implemented method of claim 1, wherein the list of text strings of URLs is stored on the client computing device in an expression file.

6. The computer-implemented method of claim 1, further comprising:
   receiving, on a server, the request to send the refined search queries based on the search query;
   accessing one or more tables populated with query terms correlated to refined query terms;
   from the refined query terms, selecting the at least one refined search query; and
   transmitting the at least one refined search query.

7. The computer-implemented method of claim 6, wherein the refined search query is selected using confidence scores associated with each of the refined query terms.

8. The computer-implemented method of claim 7, wherein each confidence score is based on at least one member of a group comprising:
   a related-search clickthrough rate (CTR) indicating the frequency users have historically opted to search for at least one of the refined query terms;
   a follow-up CTR indicating the frequency users have historically clicked a result stemming from a search of the at least one of the refined query terms;
   a search engine switching rate; and
   a reformulation rate.

9. The computer-implemented method of claim 1, wherein the first vertical and the second vertical indicate a vertical search engine that searches for particular types of online content.

10. A computer-memory device storing computer-executable instructions that, when executed by a processor, perform a method for displaying a refined search query in a web browser, the method comprising:
   receiving a search query in a web-page search field displayed in the web browser, which includes a toolbar having a toolbar search field separate from the web-page search field, wherein the web-page search field provides a first portal to a first search engine hosted at a first web domain and wherein the toolbar search field provides a second portal to a second search engine hosted at a second web domain, which is different than the first web domain;
   recognizing that a web page providing the web-page search field is associated with the first search engine by comparing at least a portion of a URL of the displayed web page with a list of text strings of URLs identified as search engines and by correlating the at least a portion of the URL with one or more text strings included in the list of text strings;
   communicating to the second search engine a request to send a refined search query when the search query is sent to the first search engine;
   receiving the refined search query from the second search engine and search results from the first search engine deemed relevant to the search query; and displaying the search results from the first search engine hosted at the first web domain in a content-viewing portion of the web browser simultaneous with the refined search query from the second search engine hosted at the second web domain, which is displayed in the toolbar search field.

11. The device of claim 10, further comprising:

while displaying the search results provided by the first search engine hosted at the first web domain, receiving an indication to search for the refined search query;

submitting the refined search query to the second search engine hosted at the second web domain different than the first web domain; and displaying results for the refined search query in a results page generated and provided by the second search engine.

12. The device of claim 10, wherein comparing at least a portion of the URL of the displayed web page with the list of text strings of URLs identified as search engines includes identifying a URL of the web page with an entry in a table associated with the toolbar.

13. The device of claim 10, wherein recognizing the web page is associated with the first search engine further comprises analyzing content of the web page.

14. A system including a processor that is coupled with a computer-memory device and that executes computer-executable instructions stored on the computer-storage device to perform operations comprising:

receiving a search query input into a web-page search field that is displayed by the web browser in a displayed web page, wherein the web-page search field provides a first portal to a first search engine hosted at a first web domain;

recognizing, by a toolbar of the web browser, that the displayed web page is associated with a the first search engine by comparing at least a portion of a URL of the displayed web page with a list of text strings of URLs identified as search engines and by correlating the at least a portion of the URL with one or more text strings included in the list of text strings, the toolbar including a toolbar search field that is separate from the web-page search field and that provides a second portal to a second search engine hosted at a second web domain, which is different than the first web domain;

identifying, by the toolbar, a first vertical that is selected to be applied to the search query;

communicating a request to send a refined search query when the search query is sent to the first search engine, wherein the request specifies the first vertical;

receiving the refined search query, which includes a second vertical different from the first vertical and is recommended to be submitted to the second search engine, and search results deemed relevant by the first search engine to the search query; and displaying the search results in a content-viewing portion of the web browser simultaneous with the refined search query, which is displayed in the toolbar search field.

15. The system of claim 14, wherein recognizing, by the toolbar of the browser, comprises:

accessing an expression file maintained by the web browser by to match a webpage address of the web page to the first search engine.

16. The system of claim 14, wherein the refined search query includes a recommendation to search in the second vertical that is different from the first vertical to which the search query was directed.

* * * * *